United States Patent [19]

Occelli

[11] Patent Number: 5,064,793
[45] Date of Patent: Nov. 12, 1991

[54] CATALYST COMPOSITION CONTAINING A CRYSTALLINE GALLIOSILICATE HAVING THE ERIONITE-TYPE STRUCTURE

[75] Inventor: Mario L. Occelli, Yorba Linda, Calif.

[73] Assignee: Union Oil Company of California, Los Angeles, Calif.

[21] Appl. No.: 345,687

[22] Filed: May 1, 1989

Related U.S. Application Data

[62] Division of Ser. No. 922,272, Oct. 22, 1986, Pat. No. 4,931,266.

[51] Int. Cl.⁵ .............................................. B01J 29/04
[52] U.S. Cl. ...................................................... 502/61
[58] Field of Search ........................................... 502/61

[56] References Cited

U.S. PATENT DOCUMENTS

| | | | |
|---|---|---|---|
| 2,950,952 | 8/1960 | Breck et al. | 423/332 |
| 3,431,219 | 3/1969 | Argauer | 423/328 |
| 3,699,139 | 10/1972 | Rubin et al. | 502/62 |
| 3,783,124 | 1/1974 | Rubin et al. | 502/62 |
| 3,947,482 | 3/1976 | Albers et al. | 423/328 |
| 4,086,186 | 4/1978 | Rubin et al. | 423/328 |
| 4,303,791 | 12/1981 | Audeh | 423/328 |
| 4,331,643 | 5/1982 | Rubin et al. | 423/329 |
| 4,331,774 | 5/1982 | Boersma et al. | 518/714 |
| 4,360,419 | 11/1982 | Miller | 208/111 |
| 4,376,757 | 3/1983 | Hinnenkamp et al. | 502/167 |
| 4,495,303 | 1/1985 | Kuehl | 423/328 |
| 4,521,297 | 6/1985 | Angevine et al. | 208/89 |
| 4,554,260 | 11/1985 | Pieters et al. | 502/61 |
| 4,585,641 | 4/1986 | Barri et al. | 423/331 |
| 4,605,804 | 8/1986 | Chang et al. | 423/326 |
| 4,683,214 | 7/1987 | Angevine et al. | 502/66 |

FOREIGN PATENT DOCUMENTS

| | | |
|---|---|---|
| 1413470 | 11/1975 | Canada . |
| 1182096 | 2/1985 | Canada . |
| 0107875 | 4/1984 | European Pat. Off. . |
| 0130013 | 1/1985 | European Pat. Off. . |
| 0134058 | 3/1985 | European Pat. Off. . |
| 190818 | 11/1983 | Japan . |
| 8504863 | 11/1985 | World Int. Prop. O. ............. 502/61 |

OTHER PUBLICATIONS

N. V. Kljueva, N. D. Tien, and K. G. Ione, "Synthesis of Olefins from Methanol on Erionite and Mordenite with Isomorphous Substitution of $Si^{4+}$ Cations by $B^{3+}$, $Ga^{3+}$ or $Fe^{3+}$", *Proceedings of the International Symposium on Zeolite Catalysis, Siofolk* (Hungary), May 13–16, 1985, pp. 525–534.

J. M. Newsam, D. E. W. Vaughan, "Structural Studies of Gallosilicate Zeolites", *New Developments in Zeolite Science and Technology*, Proceedings of the 7th International Zeolite Conference, Tokyo, 1986, pp. 457–464.

M. L. Occelli, R. A. Innes, S. S. Pollack, and J. V. Sanders, "Quaternary Ammonium Cation Effects on the Crystallization of Offretite-Erionite Type Zeolites: Part I. Synthesis and Catalytic Properties", *Zeolites*, vol. 7, No. 3, May 1987, pp. 265–271.

(List continued on next page.)

Primary Examiner—Carl F. Dees
Attorney, Agent, or Firm—Yale S. Finkle; Gregory F. Wirzbicki

[57] ABSTRACT

A crystalline, galliosilicate molecular sieve having the erionite-type structure and the following composition expressed in terms of oxide mole ratios in the anhydrous state:

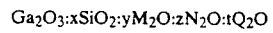

$$Ga_2O_3 : xSiO_2 : yM_2O : zN_2O : tQ_2O$$

where M is an alkali metal, preferably sodium, N is an alkali metal other than M, preferably potassium, Q is a cation derived from the templating agent used in synthesizing the galliosilicate molecular sieve, preferably a choline cation, x equals 5.5 to 30, y equals 0.1 to 0.9, z equals 0.1 to 0.9, t equals 0.1 to 0.6 and $y+z+t$ equals about 1.0. The crystalline, galliosilicate molecular sieve of the invention may be employed, after reducing its alkali metal content, as a component of a catalyst which can be used in a variety of chemical conversion processes, preferably hydrocarbon conversion processes, and most preferably hydrodewaxing, hydrocracking and isomerization processes.

18 Claims, 2 Drawing Sheets

OTHER PUBLICATIONS

K. P. Lillerud and J. H. Raeder, "On the Synthesis of Erionite-Offretite Intergrowth Zeolites", *Zeolites*, vol. 6, No. 6, Nov. 1986, pp. 474-483.

M. L. Occelli, R. A. Innes, T. M. Apple and B. C. Gerstein, "Surface Properties of Offretite and ZSM-34 Zeolites", Sixth International Zeolite Conference, 1983, pp. 674-683.

J. V. Sanders, M. L. Occelli, R. A. Innes, and S. S. Pollack, "Quaternary Ammonium Cation Effects on the Crystallization of Zeolites of the Offretite-Erionite Family, Part II. Electron Diffraction Studies", *New Developments in Zeolite Science and Technology*, Proceedings of the 7th International Zeolite Conference, Tokyo, 1986, pp. 429-436.

J. Selbin and R. B. Mason, "Preparation of Gallium-Containing Molecular Sieves", *J. Inorg. Nucl. Chem.*, vol. 20, 1961, pp. 222-228.

K. Suzuki, Y. Kiyozumi, S. Shin and S. Ueda, "Synthesis of New Gallosilicate Zeolite with Sodalite Structure", *Zeolites*, vol. 5, 1985, pp. 11-14.

S. Hayashi, K. Suzuki, S. Shin, K. Hayamizu and O. Yamamoto, "High Resolution $^{29}$Si Nuclear Magnetic resonance Study on Gallosilicates with Zeolite Structures", *Bull. Chem. Soc. Jpn.*, vol. 58, 1985, pp. 52-57.

CATALYST COMPOSITION CONTAINING A CRYSTALLINE GALLIOSILICATE HAVING THE ERIONITE-TYPE STRUCTURE

CROSS REFERENCE TO RELATED APPLICATIONS

This application is a division of U.S. patent application Ser. No. 922,272 filed in the United State Patent and Trademark Office on Oct. 22, 1986, U.S. Pat. No. 4,931,266.

BACKGROUND OF THE INVENTION

This invention relates to crystalline galliosilicates and is particularly concerned with a crystalline galliosilicate molecular sieve having the erionite-type structure, methods of producing such a molecular sieve, catalysts containing such a molecular sieve and processes for using catalysts containing such a molecular sieve.

Zeolites are well known natural and synthetic molecular sieves that can be defined as crystalline, three-dimensional aluminosilicates consisting essentially of alumina and silica tetrahedra which interlock to form discrete polyhedra. The polyhedra are interconnected to form a frame-work which encloses cavities or voids interconnected by channels or pores. The size of the cavities and pores will vary depending on the framework structure of the particular zeolite. Normally, the cavities are large enough to accommodate water molecules and large cations which have considerable freedom of movement, thereby permitting sorption, reversible dehydration and ion exchange. The dimensions of the cavities and pores in a zeolite are limited to a small number of values and can vary from structure to structure. Thus, a particular zeolite is capable of sorbing molecules of certain dimensions while rejecting those of dimensions larger than the pore size associated with the zeolite structure. Because of this property zeolites are commonly used as molecular sieves.

In addition to their molecular sieving properties, zeolites show a pronounced selectivity toward polar molecules and molecules with high quadrupole moments. This is due to the ionic nature of the crystals which gives rise to a high nonuniform electric field within the micropores of the zeolite. Molecules which can interact energetically with this field, such as polar or quadrupolar molecules, are therefore sorbed more strongly than nonpolar molecules. This selectivity toward polar molecules is the unique property of zeolites which allows them to be used as drying agents and selective sorbents.

The pore size of a zeolite can vary from about 2.6 Angstroms for analcime to about 10.0 Angstroms for zeolite omega. The term "pore size" as used herein refers to the diameter of the largest molecule that can be sorbed by the particular zeolite or other molecular sieve in question. The measurement of such diameters and pore sizes is discussed more fully in Chapter 8 of the book entitled "Zeolite Molecular Sieves," written by D. W. Breck and published by John Wiley & Sons in 1974, the disclosure of which book is hereby incorporated by reference in its entirety. The pore size range of 2.6 to 10.0 Angstroms is particularly suited for molecular separation and catalytic processing. Analcime will sorb ammonia while excluding larger molecules whereas zeolite omega will sorb perfluorotributyl amine [$C_4F_9)_3N$] while excluding any molecule having a diameter greater than about 10.0 Angstroms. All of the other approximately 150 zeolites now known have pore sizes falling within the range between 2.6 and 10.0 Angstroms.

In addition to their use as drying agents and selective sorbents, zeolites are widely used as components of chemical conversion catalysts. As found in nature or as synthesized, zeolites are typically inactive because they lack acid sites. In general, acid sites are created by subjecting the zeolite to an ion exchange with ammonium ions followed by some type of thermal treatment which creates acid sites by decomposing the ammonium ions into gaseous ammonia and protons. Activated zeolites have been used in many types of chemical conversion processes with the smaller pore zeolites being used to selectively sorb and crack normal and moderately branched chain paraffins.

Because of the unique properties of zeolitic molecular sieves, there have been many attempts at synthesizing new molecular sieves by either substituting an element for the aluminum or silicon present in zeolitic molecular sieves or adding another element in addition to the aluminum and silicon. The term "zeolitic" as used herein refers to molecular sieves whose frameworks are formed of substantially only silica and alumina tetrahedra. One such class of new molecular sieves that has been created is that in which all the framework aluminum has been replaced by gallium. Specifically, it has been reported in the literature that galliosilicate molecular sieves having the faujasite structure, the pentasil structure and the mordenite structure have been synthesized. The synthesis of a galliosilicate analogue of Theta-1 zeolite has also been reported There has, however, been no reported instance of a galliosilicate with the erionite-type structure having been synthesized.

Accordingly, it is one of the objects of the present invention to provide a crystalline, galliosilicate molecular sieve with the erionite-type structure, and a method for preparing such a molecular sieve, which may be useful in many types of chemical conversion processes, particularly hydrocarbon conversion processes. This and other objects of the invention will become more apparent in view of the following description of the invention.

SUMMARY OF THE INVENTION

In accordance with the invention it has now been found that a crystalline, galliosilicate molecular sieve comprising silicon, gallium and oxygen and having the erionite-type crystal structure can be synthesized by mixing a source of gallia, a source of silica, a source of one alkali metal, a source of a different alkali metal, a templating agent and water to form a hydrogel in which the components have the following mole ratios:

$SiO_2/Ga_2O_3 = 8$ to 30

$(M_2O + N_2O)/Ga_2O_3 = 1$ to 15

$H_2O/Ga_2O_3 = 80$ to 1000

$Q_2O/Ga_2O_3 = 0.1$ to 10 where M is an alkali metal, N is an alkali metal other than M and Q is a cation derived from the templating agent. After the above-described hydrogel is formed, it is crystallized to form the synthetic, crystalline, galliosilicate molecular sieve of the invention. This molecular sieve typically has the composition, expressed in terms of oxide mole ratios in the anhydrous state, of $Ga_2O_3:xSiO_2:yM_2O:zN_2O:tQ_2O$ where x equals 5.5 to 30, y equals 0.1 to 0.9, z equals 0.1 to 0.9, t equals 0.1 to 0.6, and z+y+t equals about 1.0 The X-ray powder diffraction pattern of the molecular sieve contains at least the d-spacings set forth in Table 1 below, which d-spacings are characteristic of a zeolite with the erionite-type structure.

TABLE 1

| Interplanar d-spacings (Angstroms) | Relative Intensity (100 × I/I₀) |
|---|---|
| 11.52 ± 0.50 | 80–100 |
| 9.17 ± 0.30 | 2–20 |
| 6.64 ± 0.20 | 30–60 |
| 5.36 ± 0.20 | 2–20 |
| 4.98 ± 0.15 | 2–20 |
| 4.40 ± 0.15 | 30–60 |
| 4.20 ± 0.15 | 2–25 |
| 3.77 ± 0.15 | 30–100 |
| 3.61 ± 0.10 | 30–80 |
| 2.86 ± 0.10 | 30–90 |

In a preferred galliosilicate molecular sieve, M is sodium, N is potassium, and Q is a quaternary ammonium cation, most preferably a choline cation.

DETAILED DESCRIPTION OF THE INVENTION

Figure 1:
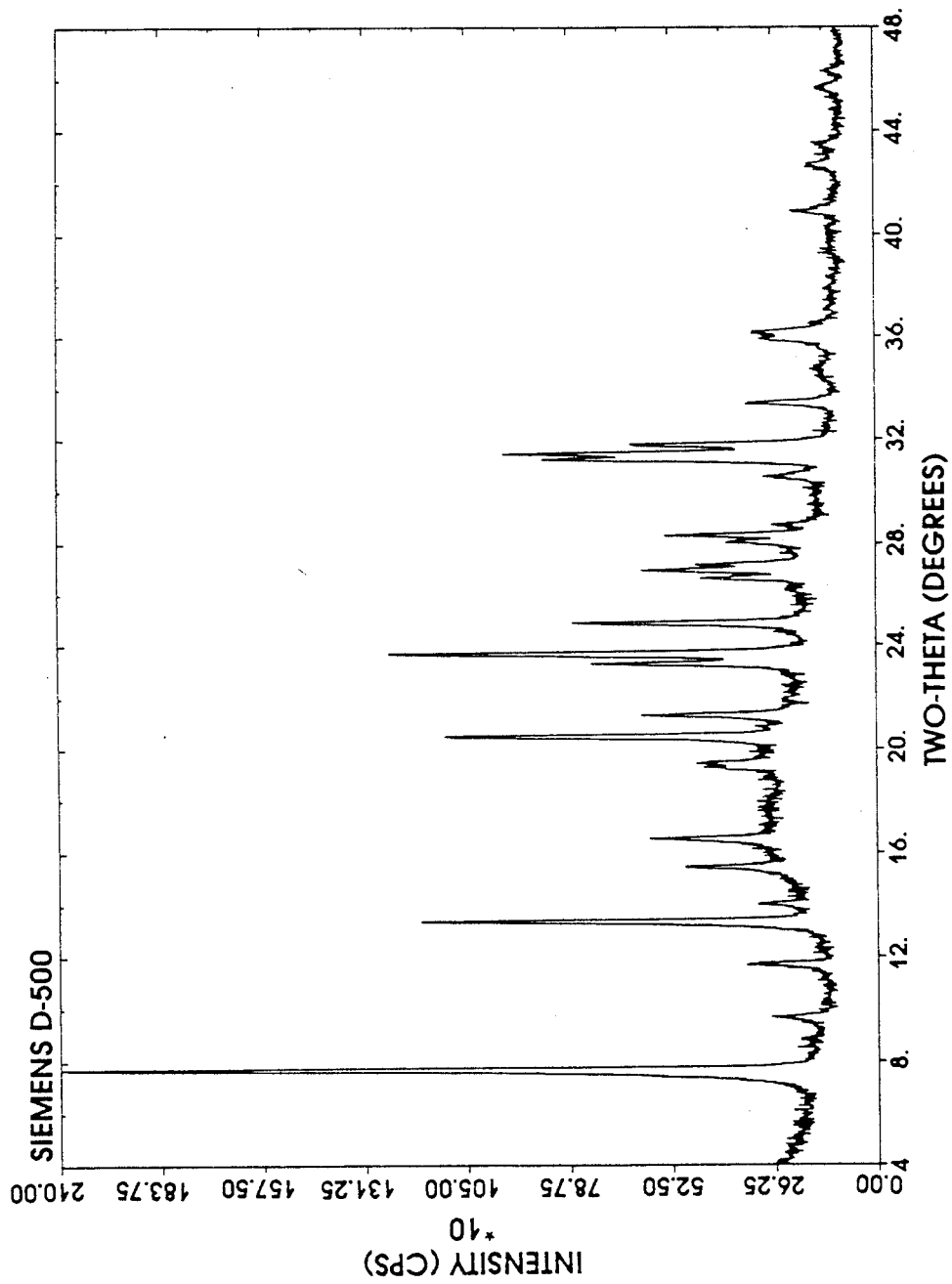
FIG. 1 in the drawing shows the X-ray powder diffraction pattern of a natural zeolite with the erionite structure.

The crystalline, galliosilicate molecular sieve of the invention is prepared by crystallizing a hydrogel formed by mixing a source of gallia, a source of silica, a source of two different alkali metals and a templating agent with water under conditions such that the various components react to form the desired hydrogel. Since a source of alumina is not used in forming the hydrogel, the only alumina present in the crystallized galliosilicate will be alumina impurities in the other source materials. Thus, the galliosilicate molecular sieve of the invention will normally contain less than about 0.1 weight percent alumina, preferably less than 0.05 weight percent, and will usually be substantially free of both alumina & aluminum.

The silica used in forming the hydrogel may be in the form of sodium silicate, silica hydrosols, silica gels, silica salts and reactive amorphous solid silicas. The source of the silica can be in either the liquid or solid state. Examples of reactive, amorphous solid silicas that may be used include fumed silicas, chemically precipitated silicas, and precipitated silica sols usually having a particle size of less than 1 micron in diameter. The preferable sources of silica are sodium silicates (water glass) and aqueous colloidal dispersions of silica particles.

The source of alkali metals used in forming the hydrogel may be an alkali metal salt or hydroxide. Although any combination of two different alkali metal sources may be utilized, it is preferable that a source of sodium and a source of potassium be employed. It is possible for the source of the alkali metal to also be the source of gallia utilized to form the hydrogel. Alkali metal gallates are examples of materials which serve as a source of both an alkali metal and gallia.

The gallia used to produce the hydrogel from which the galliosilicate molecular sieve of the invention is crystallized may be in the form of gallium oxide, gallium hydroxide, an alkali metal gallate or an inorganic gallium salt, such as gallium nitrate, gallium sulfate, and gallium acetate. As mentioned above, the source of the gallia may also be the source of the alkali metals required to form the hydrogel. In fact, a preferred source of gallia is prepared by dissolving gallium oxide in an aqueous solution of sodium and potassium hydroxide to form potassium gallate and sodium gallate which are then used as components to form the hydrogel.

The templating agent used to form the hydrogel is normally any component which directs crystallization of the hydrogel toward the erionite-type structure. Typically, the templating agent is either an amine or certain types of quaternary ammonium compounds. Examples of amines useful as the templating agent include ethylene diamine, diethyl triamine, triethylene tetraamine, and alkanolamines. The preferred templating agents include quaternary ammonium compounds selected from the group consisting of choline chloride, benzyltrimethyl ammonium chloride or hydroxide, benzyltriethyl ammonium chloride or hydroxide and derivatives of 1,4-diazabicyclo (2,2,2) octane. The most preferred templating agents for use in making the crystalline galliosilicate of the invention are choline salts such as choline chloride and the like.

The hydrogel from which the galliosilicate molecular sieve of the invention is crystallized is normally prepared by first dissolving the source of gallia in a clear solution containing a mixture of two alkali metal hydroxides, preferably potassium and sodium hydroxide. The resulting solution is then mixed with a templating agent and a source of silica to form the gel which is then vigorously stirred. A sufficient amount of the gallia source, the silica source, the sources of alkali metals, the templating agent and water is used so that the resultant hydrogel contains the following oxide mole ratios of components:

$SiO_2/Ga_2O_3 = 8$ to 30, preferably 10 to 15
$(M_2O + N_2O)/Ga_2O_3 = 1$ to 15, preferably 2 to 5
$H_2O/Ga_2O_3 = 80$ to 1000, preferably 100 to 400
$Q_2O/Ga_2O_3 = 0.1$ to 10, preferably 0.5 to 4.0 where M is an alkali metal, preferably sodium, N is another alkali metal, preferably potassium, and Q is a cation derived from the templating agent, preferably a choline cation, a benzyltrimethyl ammonium cation, a benzyltriethyl ammonium cation or a cation derived from 1,4-diazabicyclo (2,2,2) octane. In order to maximize the yield of crystals having the erionite-type structure during crystallization of a hydrogel in which M is sodium and N is potassium, it is normally preferred that the concentration of the sodium and potassium in the hydrogel be such that the mole ratio of $K_2O$-to-$Na_2O$ is below about 1.0. This is especially true when Q is a choline cation, a benzyltrimethyl ammonium cation, a benzyltriethyl ammonium cation or a cation derived from 1,4-diazabicyclo (2,2,2) octane.

After all of the components of the hydrogel have been combined together, the hydrogel is vigorously stirred at atmospheric pressure and at a temperature between about 20° C. and about 150° C., preferably at about room temperature, for from about 1 hour to about 2 days, preferably between about 1 hour and about 10 hours. After stirring, the hydrogel is crystallized by heating, with or without stirring, for between about 2 days and 10 days at temperatures in the range between about 70° C. and 250° C., preferably between about 90° C. and 175° C. The temperature is normally controlled within the above ranges to avoid the formation of phase impurities. After the hydrogel has been crystallized, the resulting slurry is passed to a filter, centrifuge or other separation device to remove the excess reactants or mother liquor from the crystallized molecular sieve The crystals are then washed with water and dried at a temperature between about 50° C. and about 200° C. to remove surface water.

The dried crystals produced as described above comprise the molecular sieve of the invention and will normally have the following composition expressed in terms of oxide mole ratios in the anhydrous state:

$$Ga_2O_3:xSiO_2:yM_2O:zN_2O:tQ_2O \qquad (1)$$

where M is an alkali metal, preferably sodium, N is an alkali metal other than M, preferably potassium, Q is a cation derived from the templating agent used in synthesizing the molecular sieve of the invention, x equals 5.5 to 30, preferably 6 to 15, y equals 0.1 to 0.9, z equals 0.1 to 0.9, t equals 0.1 to 0.6 and the sum of y, z, and t equals approximately 1.0. The X-ray powder diffraction pattern of the crystallized molecular sieve of the invention will typically contain at least the d-spacings set forth in Table 1, preferably the d-spacings set forth in Table 2 below.

TABLE 2

| Bragg Angle 2-Theta (Degrees) | Interplanar d-spacings (Angstroms) | Relative Intensity (100 × I/I$_o$) |
|---|---|---|
| 7.5–7.9 | 11.78–11.18 | 80–100 |
| 9.4–9.9 | 9.40–8.93 | 2–20 |
| 11.4–11.8 | 7.75–7.49 | 15–30 |
| 13.1–13.5 | 6.75–6.55 | 30–60 |
| 13.7–14.2 | 6.46–6.23 | 5–25 |
| 15.2–15.6 | 5.82–5.67 | 15–40 |
| 16.3–16.7 | 5.43–5.30 | 2–20 |
| 17.6–18.0 | 5.03–4.92 | 2–20 |
| 19.1–19.6 | 4.64–4.52 | 15–60 |
| 20.2–20.6 | 4.39–4.31 | 30–60 |
| 21.1–21.5 | 4.21–4.13 | 2–25 |
| 23.0–23.5 | 3.86–3.78 | 30–60 |
| 23.4–23.8 | 3.80–3.73 | 30–100 |
| 24.4–24.9 | 3.64–3.57 | 30–80 |
| 26.7–27.2 | 3.33–3.27 | 15–45 |
| 28.1–28.5 | 3.17–3.13 | 10–35 |
| 31.0–31.4 | 2.88–2.85 | 30–90 |
| 31.6–32.0 | 2.83–2.79 | 5–30 |
| 33.1–33.5 | 2.70–2.67 | 5–30 |
| 35.6–36.0 | 2.52–2.49 | 5–25 |

The X-ray powder diffraction data set forth in Tables 1 and 2 are characteristic of a molecular sieve having the erionite-type structure. For comparison purposes, the X-ray power diffraction pattern of a natural erionite found in or around the area of Rome, Oreg. is shown in FIG. 1, and the corresponding X-ray powder diffraction data are set forth in Table 3. Natural erionite from Rome, Oreg. has been described in a paper by F. A. Mumpton and W. C. Ormsby entitled "Morphology of Zeolites in Sedimentary Rocks by Scanning Electron Microscopy," appearing beginning at page 113 in the book entitled *Natural Zeolites, Occurrence, Properties, Use*," edited by L. B. Sound and F. A. Mumpton and published by Pergamon Press in 1978. The disclosure of this book is hereby incorporated by reference in its entirety.

TABLE 3

| X-Ray Diffraction Data for a Natural Zeolite with the Erionite Structure | | |
|---|---|---|
| Bragg Angle 2-Theta (Degrees) | Interplanar d-spacings (Angstroms) | Relative Intensity (100 × I/I$_o$) |
| 7.715 | 11.4505 | 100.0 |
| 9.676 | 9.1336 | 6.8 |
| 11.719 | 7.5452 | 11.3 |
| 13.382 | 6.6111 | 51.6 |
| 14.052 | 6.2973 | 6.7 |
| 15.472 | 5.7227 | 13.8 |
| 16.556 | 5.3502 | 16.8 |
| 19.425 | 4.5659 | 10.0 |
| 20.519 | 4.3249 | 43.3 |
| 21.348 | 4.1589 | 20.1 |
| 23.311 | 3.8128 | 28.1 |
| 23.685 | 3.7534 | 54.7 |
| 24.877 | 3.5763 | 31.2 |
| 26.657 | 3.3413 | 10.8 |
| 26.975 | 3.3027 | 18.0 |
| 28.114 | 3.1715 | 7.4 |
| 28.338 | 3.1489 | 15.2 |
| 30.569 | 2.9221 | 7.3 |
| 31.260 | 2.8590 | 36.3 |
| 31.433 | 2.8437 | 41.4 |
| 31.797 | 2.8120 | 25.0 |
| 33.468 | 2.6753 | 12.0 |
| 35.954 | 2.4958 | 10.2 |
| 36.154 | 2.4824 | 10.8 |
| 39.284 | 2.2916 | 2.7 |
| 40.936 | 2.2029 | 6.5 |
| 43.494 | 2.0790 | 3.0 |
| 45.720 | 1.9828 | 3.7 |
| 46.345 | 1.9575 | 3.1 |

The X-ray powder diffraction data set forth in Tables 1 and 2 for the crystalline galliosilicate of the invention are based on data obtained using a Siemens D-500 X-ray diffractometer with a graphite-crystal monochromatized Cu-K alpha radiation. The peak heights I, and their position as a function of 2-theta, where theta is the Bragg angle, were read from the diffractometer output. From this output the relative intensities, $100 \times I/I_o$, where $I_o$ is the intensity of the strongest peak, were read. The interplanar spacings, d, in Angstroms corresponding to the recorded peaks were then calculated in accordance with standard procedures. It will be understood that the peak heights and d-spacings associated with the X-ray powder diffraction pattern of the galliosilicate molecular sieve of the invention may vary somewhat depending on heat treatment, unit cell composition, crystal size, and whether the molecular sieve has been exchanged with hydrogen ions or metal cations.

The water content of the crystalline, galliosilicate molecular sieve of the invention will depend on the method used for drying the particles formed upon crystallization. The amount of cations derived from the templating agent present in the dried molecular sieve will depend upon the silica-to-gallia mole ratio and the alkali metal content of the galliosilicate crystals. In general, the moles t of Q$_2$O present, as shown in formula (1) above, will equal about 1.0 minus the sum of the moles of the two different alkali metal oxides present, $z + y$.

After the synthesized galliosilicate crystals have been washed and dried, they are typically treated in order to render them active for acid catalyzed reactions. This procedure normally comprises calcining the washed and dried crystals in air at a temperature between about 400° C. and about 700° C., preferably between about 500° C. and about 600° C., for between about 5 hours and about 15 hours to decompose the cations derived from the templating agent into gaseous products. After this calcination, the galliosilicate molecular sieve is again treated, normally by ion exchange with ammonium cations, to reduce its alkali metal content to below about 2.0 weight percent, preferably below about 0.5 weight percent and most preferably below about 0.05 weight percent, calculated as the alkali metal oxide. When reducing the alkali metal content using an ammonium ion exchange technique, the molecular sieve is typically slurried for 1 to 5 hours at a temperature above ambient temperature but less than about 100° C. in an aqueous solution containing a dissolved ammonium salt, such as ammonium nitrate, ammonium sulfate, ammonium chloride and the like. Ordinarily, to achieve extremely low levels of alkali metal cations, the ion exchange procedure will be repeated at least twice, and occasionally several times. After the ammonium exchange or other treatment to reduce alkali metal content, the molecular sieve is again calcined in air under conditions similar to those used in the first calcination step. Calcination after an ammonium exchange serves to decompose the ammonium cations into ammonia, which is driven off during the calcination step, and thereby produce the catalytically active hydrogen form of the galliosilicate molecular sieve.

The crystalline, galliosilicate molecular sieve of the invention may be used as a catalyst for converting hydrocarbons and other organic compounds into more valuable reaction products by acid catalyzed reactions, such as alkylation, transalkylation, dealkylation, isomerization, dehydrocyclization, dehydrogenation, hydrogenation, cracking, hydrocracking, dewaxing, hydrodewaxing, oligomerization, aromatization, alcohol conversion reactions, the conversion of syngas to mixtures of hydrocarbons and the like. In utilizing the galliosilicates of the invention as a catalyst in conversion processes as described above, it will normally be combined with a porous, inorganic refractory oxide component, or a precursor thereof, such as alumina, silica, titania, magnesia, zirconia, beryllia, silica-alumina, silica-magnesia, silica-titania, a dispersion of silica-alumina in gamma alumina, a clay such as kaolin, hectorite, sepiolite and attapulgite, combinations of the above and the like. The preferred porous, inorganic refractory oxide component will depend upon the particular conversion process involved and will be well known to those skilled in the art. Examples of precursors that may be used include peptized alumina, alumina gel, hydrated alumina, silica-alumina, hydrogels, Ziegler-derived aluminas and silica sols. The exact amounts of crystalline galliosilicate and porous, inorganic refractory oxide used in the catalyst of the invention will again depend upon the particular conversion process in which the catalyst is to be used.

It will be understood that although the primary use of the catalyst of the invention will be in hydrocarbon conversion processes to convert hydrocarbon feedstocks into desirable reaction products, the catalyst can also be used to convert feedstocks or organic compounds other than hydrocarbons into desired reaction products. For example, the catalyst of the invention can be used to convert alcohols into transportation fuels and to convert gaseous mixtures of carbon monoxide and hydrogen into hydrocarbons. As used herein "hydrocarbon" refers to any compound which comprises hydrogen and carbon and "hydrocarbon feedstock" refers to any charge stock which contains a mixture of hydrocarbon compounds and comprises greater than about 70 weight percent carbon and hydrogen, preferably greater than about 80 weight percent, calculated as the elements.

Depending on the particular type of conversion process in which the catalyst of the invention is to be used, it may be desirable that the catalyst also contain a metal promoter or combination of metal promoters selected from Group IB, Group IIB, Group IIIA, Group IVA, Group VA, Group VIB, Group VIIB or Group VIII of the Periodic Table of Elements. As used herein "Periodic Table of Elements" refers to the version found in the inside front cover of the "Handbook of Chemistry and Physics," 65th Edition, published in 1984 by the Chemical Rubber Company, Cleveland, Ohio. Specific metal components which may be used as promoters include components of copper, silver, zinc, aluminum, gallium, indium, thallium, lead, tin, antimony, bismuth, chromium, molybdenum, tungsten, manganese, iron, cobalt, nickel, ruthenium, rhodium, palladium, iridium, platinum, rhenium, thorium and the rare earths. These metal promoters may be ion exchanged into the crystalline galliosilicate itself, they may be incorporated into the mixture of the crystalline galliosilicate and the porous, inorganic refractory oxide, or they may be added by impregnation after the catalyst particles have been formed.

The catalyst of the invention is normally prepared by mulling the crystalline galliosilicate molecular sieve in powder form with the porous, inorganic refractory oxide component. If desired, a binder such as peptized Catapal alumina may be incorporated into the mulling mixture, as also may be one or more active promoter metal precursors. After mulling, the mixture is extruded through a die having openings of a cross sectional size and shape desired in the final catalyst particles. For example, the die may have circular openings to produce cylindrical extrudates, openings in the shape of three-leaf clovers so as to produce an extrudate material similar to that shown in FIGS. 8 and 8A of U.S. Pat. No. 4,028,227, the disclosure of which is hereby incorporated by reference in its entirety, or openings in the shape of four-leaf clovers. Among preferred shapes for the die openings are those that result in particles having surface-to-volume ratios greater than about 100 reciprocal inches. If the die opening is not circular in shape, it is normally desirable that the opening be in a shape such that the surface-to-volume ratio of the extruded particles is greater than that of a cylinder. After extrusion, the extruded catalyst particles are broken into lengths of from 1/16 to ½ inch and calcined in air at a temperature of at least 750° F., usually between about 800° F. and about 1200° F., and preferably in the range between about 900° F. and 1050° F.

As mentioned previously, metal promoter components may be mulled, either as a solid or liquid, with the galliosilicate of the invention and the porous, inorganic refractory oxide component to form the catalyst extrudates prior to the calcination step. Alternatively, the metal promoter component or components may be added to the catalyst by impregnation after the calcination step. The metal promoter component or components may be impregnated into the calcined extrudates from a liquid solution containing the desired metal promoter component or components in dissolved form. In some cases, it may be desirable to ion exchange the calcined extrudates with ammonium ions prior to adding the metal promoter component or components. After the calcined extrudates have been impregnated with the solution containing the metal promoter component or components, the particles are dried and calcined in the air at a temperature normally ranging between about 800° F. and about 1100° F. to produce the finished catalyst particles.

In addition to the crystalline, galliosilicate molecular sieve of the invention, the catalyst of the invention may also contain other molecular sieves such as aluminosilicates, borosilicates, aluminophosphates, silicoaluminophosphates, naturally occurring zeolites, pillared clays and delaminated clays. Suitable aluminosilicates for combining with the crystalline galliosilicate of the invention include Y zeolites, ultrastable Y zeolites, X zeolites, zeolite beta, zeolite L, faujasite and zeolite omega. The actual molecular sieve used in combination with the crystalline galliosilicate will depend upon the particular conversion process in which the catalyst of the invention is to be used. The molecular sieve of choice is normally incorporated into the catalyst by mixing the molecular sieve with the crystalline galliosilicate and porous, inorganic refractory oxide prior to mulling and extrusion.

It is typically preferred to use catalysts containing the crystalline galliosilicate molecular sieve of the invention in hydroconversion processes such as hydrocracking, isomerization and hydrodewaxing. When used in such processes, the catalyst will normally contain hydrogenation components comprising metals selected from Group VIII and/or Group VIB Of the Periodic Table of Elements. These hydrogenation metal components are incorporated into the catalyst extrudates either prior to or after extrusion. Examples of Group VIII and Group VIB metal components that may be used include nickel, cobalt, tungsten, molybdenum, palladium and platinum components. In some cases, it may be desirable that the catalyst contain at least one Group VIII metal component and at least one Group VIB metal component. When this is the case, the preferred combination is a nickel and/or cobalt component with a molybdenum and/or tungsten component.

If the hydrogenation metal component consists essentially of a noble metal such as platinum or palladium, it is generally desired that the finished catalyst particles contain between about 0.05 and about 10 weight percent of the hydrogenation metal component, preferably between about 0.10 weight percent and about 3.0 weight percent, calculated as the metal. If on the other hand, the hydrogenation metal component consists essentially of one or more non-noble metals, such as nickel or nickel and tungsten, it is normally desired that the finished catalyst particles contain between about 1.0 and about 40 weight percent of the hydrogenation metal components, preferably between about 3 weight percent and about 30 weight percent, calculated as the metal oxide.

Feedstocks that may be subjected to hydroconversion processes using the catalyst of the invention include mineral oils, synthetic oils, such as shale oil, oil derived from tar sands and coal liquids, and the like. Examples of appropriate feedstocks for hydroconversion processes include straight run gas oils, vacuum gas oils and catalytic cracker distillates. Preferred hydroconversion feedstocks include gas oils and other hydrocarbon fractions having at least about 50 weight percent of their components boiling above about 700° F.

In general, the temperature at which the hydroconversion process takes place is between about 450° F. and about 850° F., preferably between about 600° F. and about 800° F. The pressure will normally range between about 750 and about 3500 p.s.i.g., preferably between about 1000 and about 3000 p.s.i.g. The liquid hourly space velocity (LHSV) is typically between about 0.3 and about 5.0, preferably between about 0.5 and about 3.0. The ratio of hydrogen gas to feedstock utilized will usually range between about 1000 and about 10,000 scf/bbl, preferably between about 2000 and about 8000 scf/bbl as measured at 60° F. and one atmosphere.

The pore size of the crystalline, galliosilicate molecular sieve of the invention will normally vary between about 4.0 and about 6.0 Angstroms because of stacking faults typically associated with the erionite-type structure. Such a range of pore sizes makes the crystalline galliosilicate of the invention particularly suited for use as a component of a catalyst employed in dewaxing or hydrodewaxing processes. Dewaxing and hydrodewaxing differ from hydrocracking in that these processes involve the selective cracking of molecules and do not significantly change the boiling point range of the feedstock because essentially only the straight and slightly branched chain paraffin molecules in the feedstock are cracked while essentially all the highly branched chain paraffins, aromatic and cyclic molecules in the feedstock remain unchanged. Hydrocracking, on the other hand, involves the indiscriminate or nonselective cracking of molecules in the presence of added hydrogen and always results in a significant alteration of the boiling point range of the feedstock because a substantial proportion of all types of molecules comprising the feedstock are converted into lower boiling components. Hydrodewaxing differs from dewaxing in that the former is carried out in the presence of added hydrogen while the latter is not.

The nature and objects of the invention are further illustrated by the following examples, which are provided for illustrative purposes only and not to limit the invention as defined by claims. The examples demonstrate several methods of synthesizing a crystalline galliosilicate with the erionite-type structure.

EXAMPLE 1

An aqueous solution of potassium hydroxide and sodium hydroxide is prepared by dissolving commercial grade potassium hydroxide and sodium hydroxide crystals in distilled water. Gallium oxide is then added to the solution and the resultant mixture is vigorously stirred under boiling conditions until the gallium oxide is completely dissolved. Choline chloride is then added as the templating agent to the basic solution of gallium oxide and the mixture is stirred for an additional 30 minutes. After stirring, Ludox HS-40, a colloidal silica sol manufactured and sold by the DuPont Chemical Company, is added dropwise to the stirred mixture to form a hydrogel having the following composition expressed in terms of oxide mole ratios:

$Ga_2O_3:12\ SiO_2:2.4\ Na_2O:1.3\ K_2O:4.0$
$[(CH_3)_3NCH_2CH_2OH]_2O:250\ H_2O$

The resultant hydrogel is stirred at room temperature for 10 hours and then heated at about 125° C. in an autoclave for about 7 days. The galliosilicate crystals formed have the following composition expressed in terms of oxide mole ratios in the anhydrous state:

Ga$_2$O$_3$:6.54 SiO$_2$:0.19 Na$_2$O:0.37 K$_2$O:0.51
[(CH$_3$)$_3$NCH$_2$CH$_2$OH]$_2$O

Figure 2:
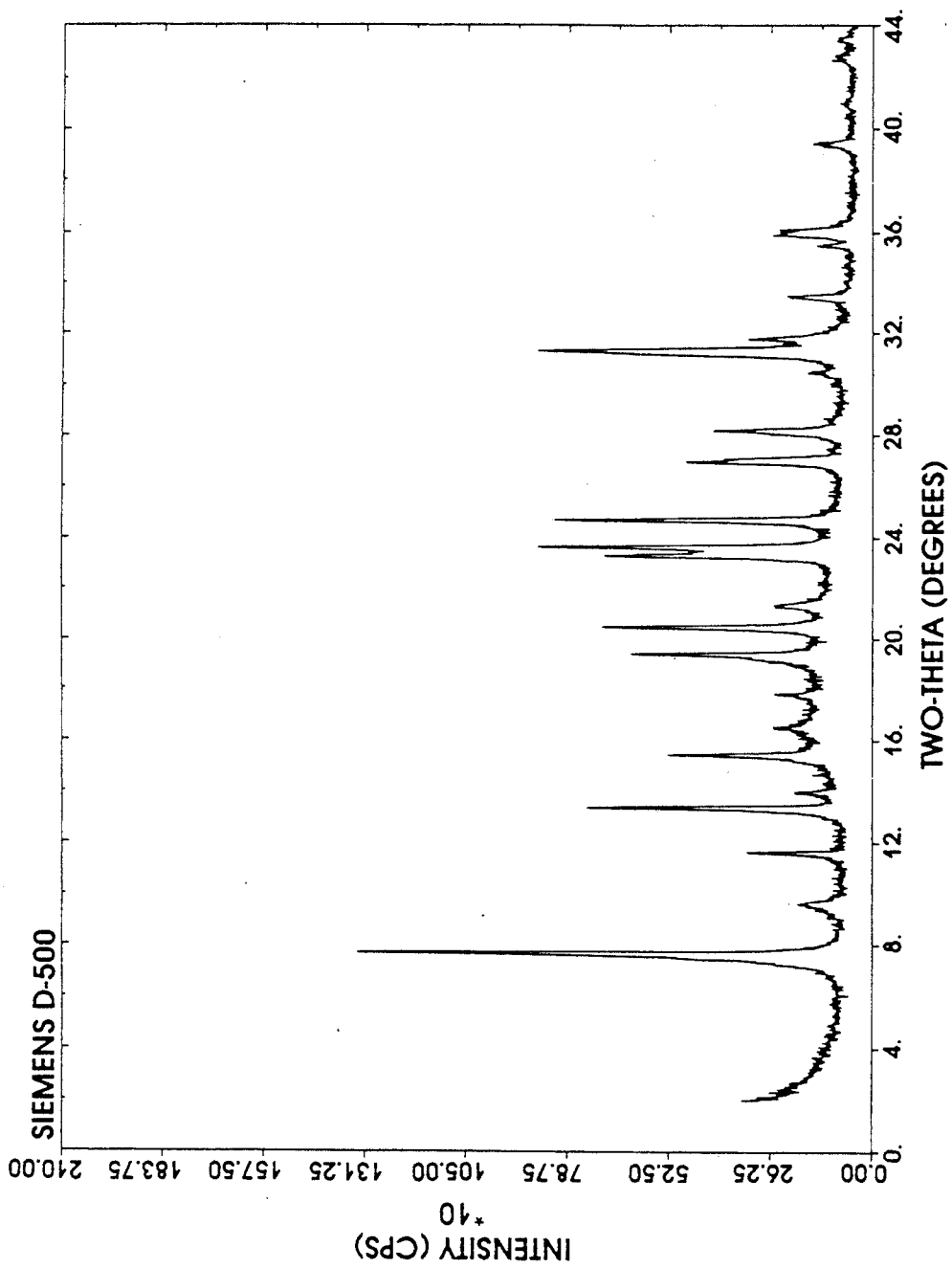
FIG. 2 depicts the X-ray powder diffraction pattern of the molecular sieve of the invention, i.e., a crystalline galliosilicate with the erionite-type structure.

An X-ray diffractogram of the crystals is obtained using a Siemens D-500 X-ray diffractometer with graphite-crystal monochromatized Cu-K alpha radiation. The resultant X-ray diffraction pattern is shown in FIG. 2 and the corresponding X-ray diffraction data including the calculated d-spacings are set forth in Table 4 below.

TABLE 4

X-Ray Diffraction Data for the Crystalline Galliosilicate of Example 1

| Bragg Angle 2-Theta (Degrees) | Interplanar d-spacings (Angstroms) | Relative Intensity (100 × I/I$_o$) |
|---|---|---|
| 7.671 | 11.5149 | 100.0 |
| 9.636 | 9.1710 | 9.9 |
| 11.632 | 7.6018 | 20.1 |
| 13.353 | 6.6254 | 51.6 |
| 13.965 | 6.3363 | 8.1 |
| 15.442 | 5.7336 | 32.4 |
| 16.525 | 5.3602 | 8.4 |
| 17.783 | 4.9838 | 8.1 |
| 19.387 | 4.5749 | 38.3 |
| 20.488 | 4.3314 | 45.4 |
| 21.342 | 4.1600 | 10.0 |
| 23.319 | 3.8116 | 43.2 |
| 23.637 | 3.7609 | 60.8 |
| 24.722 | 3.5983 | 58.7 |
| 26.985 | 3.3015 | 32.1 |
| 28.198 | 3.1622 | 25.6 |
| 30.493 | 2.9292 | 6.3 |
| 31.317 | 2.8540 | 56.5 |
| 31.790 | 2.8125 | 12.2 |
| 33.443 | 2.6773 | 13.2 |
| 35.520 | 2.5253 | 6.7 |
| 35.972 | 2.4946 | 15.6 |
| 37.541 | 2.3939 | 3.0 |
| 39.400 | 2.2851 | 8.7 |
| 42.711 | 2.1153 | 3.3 |
| 42.822 | 2.1101 | 3.0 |

The X-ray powder diffraction pattern set forth in FIG. 2 is substantially similar to that set forth in FIG. 1 for a natural zeolite with the erionite structure.
Thus, it is concluded that the crystalline galliosilicate synthesized in Example 1 has the erionite-type structure. The d-spacing values for the synthesized galliosilicate set forth in Table 4 are higher than the corresponding values in Table 3 for the zeolite with the erionite-type structure. These increases in d-spacing values are consistent with a larger unit cell size for the galliosilicate as shown in Table 5 below. This larger unit cell size is attributed to the isomorphous substitution of gallium, which has a larger ionic radius than aluminum, for aluminum in the erionite structure. Differences in the relative intensities set forth in Tables 3 and 4 result mainly from the different unit cell composition and crystal size of the two molecular sieves.

TABLE 5

| Molecular Sieve | Unit Cell Parameters | |
|---|---|---|
| | a$_o$ (Angstroms) | c$_o$ (Angstroms) |
| Natural Erionite | 13.212 | 15.089 |
| Synthetic Ga-Erionite | 13.228 | 15.200 |

The crystals of the galliosilicate formed in the autoclave are subjected to calcination in flowing air at a temperature of 600° C. to decompose the choline cations. The resultant crystals are then ion exchanged with ammonium cations by slurrying the crystals in a 3 molar solution of ammonium nitrate. The ammonium-exchanged galliosilicate crystals are then calcined at 600° C. for 10 hours. The resultant crystals have a BET surface area of about 410 m$^2$/gram and retain about 100 percent of their original crystallinity.

EXAMPLE 2

A hydrogel is prepared as described in Example 1 except that the resultant gel has the following composition expressed in terms of oxide of oxide mole ratios:

Ga$_2$O$_3$:14 SiO$_2$:2.4 Na$_2$O:1.3 K$_2$O:4.0
[(CH$_3$)$_3$NCH$_2$CH$_2$OH]$_2$:250 H$_2$O

The resultant hydrogel is stirred at room temperature for 10 hours and then heated at about 125° C. in an autoclave to form crystals. An X-ray diffractogram of the resultant crystals is obtained as described in Example 1. The resultant X-ray diffraction pattern is essentially the same as that set forth in FIG. 2, which diffraction pattern was obtained using the crystals formed in Example 1. The X-ray diffraction data is also similar to that set forth in Table 4 for the crystals formed in Example 1. Thus, it is concluded that the crystals are that of a galliosilicate having the erionite-type structure.

The crystals are calcined in flowing air at 550° C. for 10 hours to remove the choline cations. The resultant crystals have a BET surface area of 424 m2/gram and the composition, expressed in terms of oxide mole ratios, shown below.

Ga$_2$O$_3$:7.46 SiO$_2$:0.11 Na$_2$O:0.31 K$_2$O

EXAMPLE 3

A hydrogel is prepared as described in Example 1 except that benzyltrimethyl ammonium hydroxide is used as the templating agent in place of choline chloride. The benzyltrimethyl ammonium hydroxide is in the form of a 40 weight percent solution in methanol known as Sumquat 2311, which is available from the Excel Specialty Chemical Company. The resulting hydrogel has the following composition expressed in terms of oxide mole ratios:

Ga$_2$O$_3$:24 SiO$_2$:2.0 Na$_2$O:1.5 K$_2$O:4.0
(C$_{10}$H$_{16}$N)$_2$O:400 H$_2$O

The hydrogel is stirred at room temperature for 10 hours and then heated at about 170° C. for about 7 days to form crystals. An X-ray diffractogram of the crystals is obtained as described in Example 1. The resultant X-ray diffraction pattern is essentially the same as that set forth in FIG. 2, which diffraction pattern was obtained using the crystals formed in Example 1. The X-ray diffraction data is also similar to that set forth in Table 4 for the crystals formed in Example 1. Thus, it is concluded that the crystals are that of a galliosilicate having the erionite-type structure.

The crystals are calcined in flowing air at 550° C. for 10 hours to remove the benzyltrimethyl ammonium cations. The resultant crystals have the composition, expressed in terms of oxide mole ratios, shown below.

Ga$_2$O$_3$:6.1 SiO$_2$:0.5 K$_2$O:0.13 Na$_2$O

It will be apparent from the foregoing that the invention provides a crystalline, galliosilicate molecular sieve having the erionite-type structure and methods for preparing such a sieve. Catalysts containing such a molecular sieve are useful in a variety of chemical conversion processes, particularly hydrocarbon conversion processes such as isomerization, hydrodewaxing and hydrocracking.

Although this invention has been primarily described in conjunction with examples and by reference to embodiments thereof, it is evident that many alternatives, modifications and variations will be apparent to those skilled in the art in light of the foregoing description. Accordingly, it is intended to embrace within the invention all such alternatives, modifications and variations that fall within the spirit and scope of the appended claims.

I claim:

1. A catalyst composition comprising a catalytically active, crystalline, galliosilicate molecular sieve which comprises silicon, gallium and oxygen, wherein said molecular sieve has an X-ray powder diffraction pattern characteristic of the erionite structure, contains less than about 0.10 weight percent alumina, and has a silica-to-gallia mole ratio of 5.5 to 30 when its composition is expressed in terms of oxide mole ratios in the anhydrous state.

2. A catalyst composition as defined by claim 1 further comprising a porous, inorganic refractory oxide component.

3. A catalyst composition as defined by claim 2 further comprising a metal promoter component containing a metal selected from the group consisting of Group IB, Group IIB, Group IIIA, Group IVA, Group VA, Group VIB, Group VIIB and Group VIII of the Periodic Table of Elements.

4. A catalyst composition as defined by claim 3 wherein said metal promoter component contains a metal selected from the group consisting of copper, silver, zinc, aluminum, gallium, indium, thallium, lead, tin, antimony, bismuth, chromium, molybdenum, tungsten, manganese, iron, cobalt, nickel, ruthenium, rhodium, palladium, iridium, platinum, rhenium, thorium and the rare earth metals.

5. A catalyst composition as defined by claim 2 wherein said catalyst comprises at least one hydrogenation metal component selected from Group VIB metal components and at least one hydrogenation metal component selected from Group VIII metal components.

6. A catalyst composition as defined by claim 5 wherein said Group VIII metal component comprises a nickel component or a cobalt component and said Group VIB metal component comprises a tungsten component or a molybdenum component.

7. A catalyst composition comprising a catalytically active, crystalline, galliosilicate molecular sieve which comprises silicon, gallium and oxygen, wherein said molecular sieve has an X-ray powder diffraction pattern comprising the d-spacings set forth in Table 1, contains less than about 0.10 weight percent alumina, and has a silica-to-gallia mole ratio of 5.5 to 30 when its composition is expressed in terms of oxide mole ratios in the anhydrous state.

8. A catalyst composition as defined by claim 7 further comprising a porous, inorganic refractory oxide component.

9. A catalyst composition as defined by claim 8 further comprising a metal promoter component containing a metal selected from the group consisting of Group IB, Group IIB, Group IIIA, Group IVA, Group VA, Group VIB, Group VIIB and Group VIII of the Periodic Table of Elements.

10. A catalytically active, galliosilicate molecular sieve containing less than about 0.10 weight percent alumina prepared by the process comprising:
    (a) calcining the galliosilicate molecular sieve described in step (b) under conditions such that the organic cations derived from the templating agent used to synthesize said molecular sieve are decomposed; and
    (b) treating said calcined galliosilicate molecular sieve to reduce its alkali metal content, wherein said gallio-silicate molecular sieve calcined in step (a) contains less than about 0.10 weight percent alumina and has the following composition expressed in terms of oxide mole ratios in the anhydrous state:

$$Ga_2O_3:xSiO_2:yM_2O:zN_2O:tQ_2O$$

where M is an alkali metal, N is an alkali metal other than M, Q is an organic cation derived from the templating agent used in the synthesis of said galliosilicate molecular sieve calcined in step (a), x equals 5.5 to 30, y equals 0.1 to 0.9, z equals 0.1 to 0.9, t equals 0.1 to 0.6 and y+z+t equals about 1.0, said crystalline galliosilicate molecular sieve calcined in step (a) having an X-ray powder diffraction pattern comprising the d-spacings set forth in Table 1.

11. A catalytically active, galliosilicate molecular sieve as defined by claim 10 wherein said alkali metal content is reduced by ion-exchanging said calcined galliosilicate molecular sieve with ammonium cations.

12. A catalytically active, galliosilicate molecular sieve as defined by claim 10 wherein M is sodium and N is potassium.

13. A catalytically active, galliosilicate molecular sieve as defined by claim 12 wherein said calcined galliosilicate molecular sieve is ion-exchanged with ammonium cations to reduce its sodium and potassium content to below about 2.0 weight percent, calculated as $Na_2O$ and $K_2O$, and the resultant ion-exchanged molecular sieve is then calcined.

14. A catalytically active, galliosilicate molecular sieve as defined by claim 10 wherein Q comprises a quaternary ammonium cation.

15. A catalytically active, galliosilicate molecular sieve as defined by claim 10 wherein Q comprises a choline cation.

16. A catalytically active, galliosilicate molecular sieve as defined by claim 10 wherein said crystalline, galliosilicate molecular sieve calcined in step (a) has an X-ray powder diffraction pattern characteristic of the erionite structure.

17. A catalyst composition comprising the crystalline, galliosilicate molecular sieve of claim 10.

18. A catalyst composition comprising the crystalline, galliosilicate molecular sieve of claim 16.

* * * * *